United States Patent
Konogaya et al.

(10) Patent No.: US 6,791,721 B1
(45) Date of Patent: Sep. 14, 2004

(54) IMAGE READING DEVICE

(75) Inventors: Tatsuya Konogaya, Kanagawa (JP); Yoichi Nakamura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 556 days.

(21) Appl. No.: 09/626,082

(22) Filed: Jul. 26, 2000

(30) Foreign Application Priority Data

Jul. 30, 1999 (JP) .......................................... 11-216554

(51) Int. Cl.[7] .............................. H04N 1/04; H04N 1/40; H04N 1/00; H04N 5/253; H04N 3/36; H04N 3/02; H01L 27/00

(52) U.S. Cl. ...................... 358/474; 358/461; 358/406; 250/208.1; 348/96; 348/97; 348/98

(58) Field of Search ................................ 358/474, 461, 358/406; 250/208.1; 348/96, 97, 98

(56) References Cited

U.S. PATENT DOCUMENTS 3,949,225 A * 4/1976 Aguilera ..................... 250/334
6,067,109 A * 5/2000 Yamana ....................... 348/104
6,091,445 A * 7/2000 Matsui et al. ................. 348/96
6,144,408 A * 11/2000 MacLean ...................... 348/241
6,268,600 B1 * 7/2001 Nakamura et al. ........... 250/216
6,323,967 B1 * 11/2001 Fujinawa .................... 358/484
6,380,539 B1 * 4/2002 Edgar .................... 250/339.05

* cited by examiner

Primary Examiner—Edward Coles
Assistant Examiner—Houshang Safaipour
(74) Attorney, Agent, or Firm—Sughrue Mion, PLLC

(57) ABSTRACT

An image reading device which has a reduced size and which can read images at high quality. LEDs, which are respective pluralities of light emitting diode elements that emit red, green, blue and infrared light, are disposed at an area CCD scanner. A frame image of a photographic film is successively read with light of each wavelength by emitting light from the LED elements. Pixels that are affected by a scratch or dust at the photographic film are detected by the infrared light. Red, green and blue image data for such pixels is corrected by means of interpolation or the like. Thus, images can be read at high quality. Furthermore, because the LEDs are used as a light source instead of a halogen lamp, less heat is emitted, the device is more compact, and cut filters and the like are not needed.

21 Claims, 11 Drawing Sheets

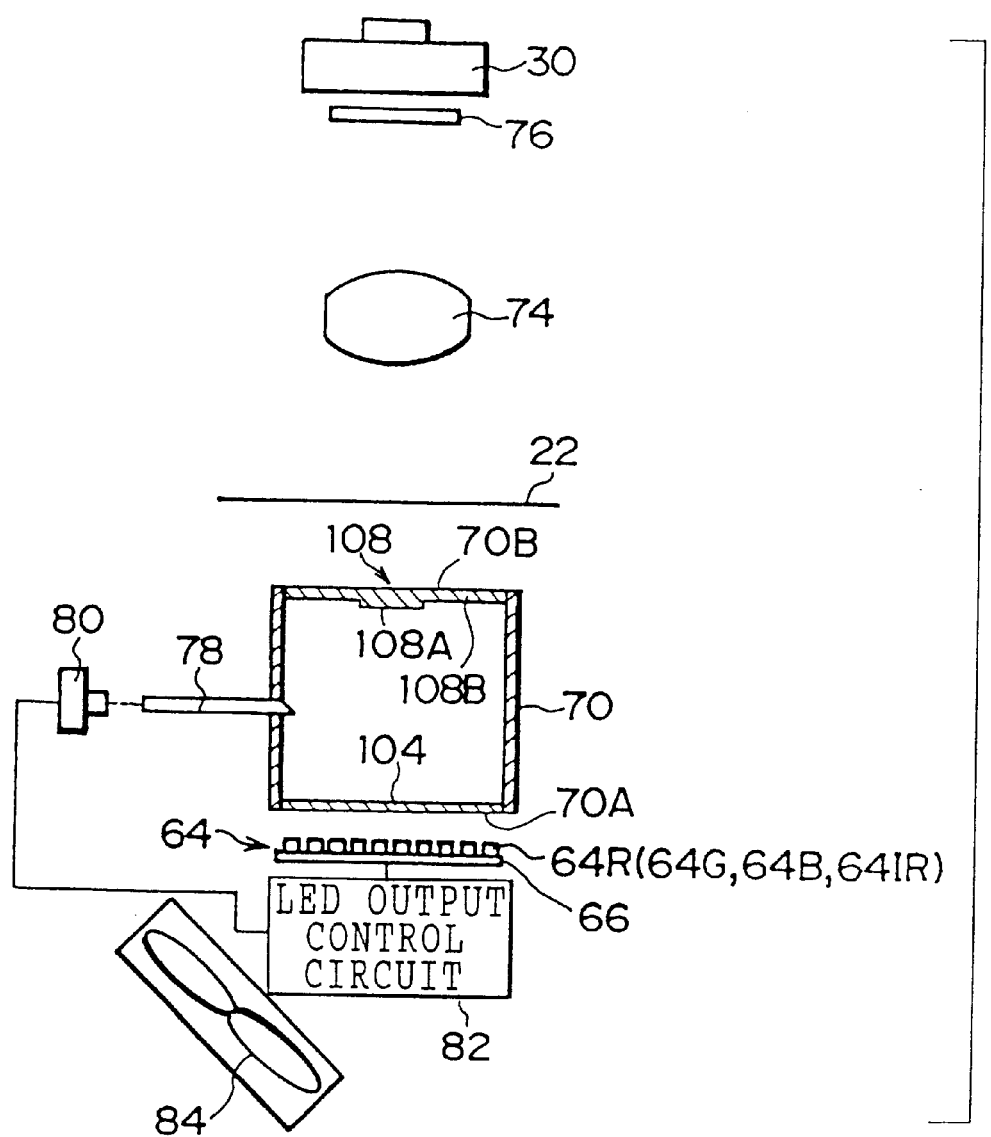

IMAGE READING DEVICE

BACKGROUND OF THE INVENTION

1. Field of the Invention

The following relates to an image reading device that precisely reads an original's image data with light passed through the original, and an image reading device that more precisely reads the image data by using invisible light.

2. Description of the Related Art

In recent years, technology has become known wherein frame images recorded on the originals of photographic films and the like are photoelectrically read by reading sensors such as CCDs and the like. Image processing such as enlargement, reduction, various kinds of correction and the like is applied to digital image data obtained by this reading, and images are formed on recording materials by laser light that is modulated on the basis of the processed digital image data.

In technology for digitally reading frame images with these reading sensors such as CCDs and the like, in order to achieve high precision image reading, a frame image is preparatorily read (so-called prescanning). Reading conditions (e.g., the amount of light to shine on the frame image and the charge accumulation time and the like of a CCD) are decided according to density and the like of the frame image, and the frame image is read again under the thus decided reading conditions (so-called fine-scanning).

As a light source for the aforementioned image reading, conventionally, a halogen lamp was used as a general exposure light and the like. Infrared light was removed at a filter and light was sensed as each of three primary colors (R, G, B). Original image reading was performed with respective filters attached at CCDs. At this time, to reduce the effect on image reading of dirt and damage applied to the original, the original was illuminated with diffused light from the light source.

Further, in order to perform image reading at a higher image quality, image reading devices were proposed wherein the original was illuminated with infrared light, and a CCD or the like read the transmitted light. Thus, inappropriate pixels caused by dirt or damage applied to the original were detected, and image-reading data detected for the three primary colors was corrected.

In the image reading devices described above, by convention, halogen lamps and the like were used as light sources. Halogen lamps had the disadvantages of generating large amounts of heat and occupying large spaces. They also required infrared-cut filters, light modulation filters and the like. Thus, they also had the disadvantage of increasing the number of components

SUMMARY OF THE INVENTION

In order to overcome the aforementioned disadvantages, an object of the present invention is to provide an image reading device that can be made smaller and that can read images at high image quality.

A first aspect of the present invention is an image reading device which reads an image recorded at an original, using visible light for reading the image and invisible light for detecting inappropriate pixels, and corrects inappropriate pixels of image data, including: a light source formed by light emitting diodes which emit visible light for reading the image and invisible light for detecting inappropriate pixels; an area sensor which reads the image by receiving light that has been one of transmitted and reflected by the image; and an image processing section which detects inappropriate pixels on the basis of invisible light image data, which has been read by invisible light at the area sensor, and corrects the inappropriate pixels at visible light image data, which has been read by means of visible light.

Operation of the first aspect of the present invention is explained below.

Visible light for image reading illuminates the original from the light source, visible light that is one of transmitted and reflected by the original is incident at the area sensor, and the visible light image data is read. Then, invisible light for inappropriate pixel detection illuminates the original from the light source, invisible light that is one of transmitted and reflected by the original is incident at the area sensor, and the invisible light image data is read.

Output of a wavelength in the invisible light region is not altered by image information at the original, but is altered by scattering if there is a scratch or the like at the original. On the other hand, a wavelength in the visible light region can reliably read the image at the original but, if there is a scratch or the like at the original, a scattered element is included in the image data that is read, and cannot be identified.

Accordingly, at the image processing section, inappropriate pixels of the image are detected from output alterations of the invisible image data. Inappropriate pixels of the visible image data corresponding to the same image are corrected by a method such as interpolation or the like. Hence, by illuminating the original with invisible light for detecting inappropriate pixels (in addition to the visible light for image reading), inappropriate pixels are accurately detected. Then, by correcting the visible light image data for the inappropriate pixels, high quality image reading can be carried out.

Moreover, because an area sensor is used for image reading, processing can be performed quickly.

Furthermore, because the light source is formed of light emitting diodes, it is smaller than a halogen lamp or the like. Moreover, filters and the like that transmit only one of visible light and invisible light are not needed. Thus, the number of components is decreased and costs are reduced. Moreover, the light emitting diodes emit little heat. Thus, image reading is not affected by heat from the light source.

A second aspect of the present invention is an image reading device according to the first aspect wherein the light source is formed by light emitting diode elements that emit visible light and which are disposed in array form, and light emitting diode elements that emit invisible light and which are disposed in array form.

Operation of the second aspect of the present invention is explained below.

The light emitting diode elements that emit visible light and the light emitting diode elements that emit invisible light are disposed in an array. Thus, a frame image is illuminated with different types of light. Thus, image reading and inappropriate pixel detection can be performed.

A third aspect of the present invention is an image reading device according to the second aspect wherein the light source is formed by light emitting diode elements of each of at least four wavelengths, including at least three visible light region wavelengths and one invisible light region wavelength, the light emitting diode elements of each wavelength being arranged in a pattern which is planar and which is the same as patterns of the light emitting diode elements of other wavelengths.

Operation of the third aspect of the present invention is explained below.

The three wavelengths in the visible light region may be, for example, three primary colors for reading the image at the original as a full-color image. The wavelength in the invisible light region is one of infrared light and ultraviolet light. Light emitting diodes that emit light of each of these wavelengths are disposed in planar patterns that are respectively the same as each other. Thus, unevenness is suppressed in the same way for each illumination.

A fourth aspect of the present invention is an image reading device according to the second aspect wherein the light source is formed by a plurality of types of light emitting diode elements disposed in rows and columns, which types of light emitting diode element respectively emit at different wavelengths, and the types of light emitting diode element are disposed alternately in at least one direction of a direction of rows and a direction of columns, and a ratio of a spacing between adjacent light emitting diode elements in the one direction to a spacing between adjacent light emitting diode elements in another direction is 1:(number of types of light emitting diode element).

Operation of the fourth aspect of the present invention is explained below.

The plurality of types of light emitting diode element that emit different wavelengths are disposed alternately in the one direction; for example, a vertical direction. The spacing between adjacent light emitting diode elements in a horizontal direction (the other direction) is a multiple of the spacing between adjacent light emitting diode elements in the vertical direction (the multiplier being the number of types of light emitting diode element). Consequently, horizontal and vertical spacings between light emitting diode elements that emit a respective wavelength are equal (1:1). Thus, unevenness of illumination by each wavelength at the area sensor is suppressed.

A fifth aspect of the present invention is an image reading device according to the third aspect, wherein the light source is formed by light emitting diode elements disposed such that distributions of light of respective wavelengths are uniform.

Operation of the fifth aspect of the present invention is explained below.

Because of such an arrangement, unevenness of illumination at the area sensor by light of a particular wavelength, which is emitted by light emitting diode elements of the respective wavelength, is suppressed.

A sixth aspect of the present invention is an image reading device according to the first aspect wherein the light source has a central portion and a peripheral portion, and the light emitting diode elements that form the light source are disposed more densely at the peripheral portion than at the central portion.

Operation of the sixth aspect of the present invention is explained below.

In a case in which the light source is a plurality of uniformly disposed light emitting diodes, the amount of light illuminating the original from the light source is less at peripheral portions than at the center. Hence, unevenness of illumination can be suppressed by the light source having a structure in which light emitting diodes are disposed more densely at the periphery than at the center.

A seventh aspect of the present invention is an image reading device according to the first aspect wherein the light source has a central portion and a peripheral portion, the light source is formed by a plurality of light emitting diode elements that emit visible light and a plurality of light emitting diode elements that emit invisible light, and, of light emitting diode elements that are disposed per unit area, the proportion that are light emitting diode elements that emit invisible light increases from the central portion to the peripheral portion of the light source.

Operation of the seventh aspect of the present invention is explained below.

The invisible light is less diffusive than the visible light. Therefore, there is a greater difference in the amount of light between the center and the periphery for invisible light than for visible light. Hence, the difference in amounts of invisible light between the center and the periphery can be suppressed by the proportion of the light emitting diode elements that are light emitting diode elements that emit invisible light increasing from the center to the periphery.

An eighth aspect of the present invention is an image reading device according to the first aspect, further including: a mirror box between the light source and the original, the mirror box having an internal reflection surface which reflects light from the light source, the mirror box thereby illuminating the original, and the mirror box having an entrance opening at which light from the light source enters the mirror box; and a diffuser provided at the entrance opening, the diffuser having a central portion and a peripheral portion, and having higher diffusiveness at the central portion than at the peripheral portion.

Operation of the eighth aspect of the present invention is explained below.

Because a diffuser that has higher diffusiveness at the central portion than at the periphery is provided at the entrance opening of the mirror box, of light entering the mirror box, light is diffused most at the central portion, where amounts of light are greatest. Thus, unevenness of illumination onto the original is suppressed.

A ninth aspect of the present invention is an image reading device according to the first aspect, further including: a mirror box between the light source and the original, the mirror box having an internal reflection surface which reflects light from the light source, the mirror box thereby illuminating the original, and the mirror box having an emergence opening at which light leaves the mirror box toward the original; and a diffuser provided at the emergence opening, the diffuser having a central portion and a peripheral portion, and having higher diffusiveness at the central portion than at the peripheral portion.

Operation of the ninth aspect of the present invention is explained below.

Because a diffuser that has higher diffusiveness at the central portion than at the periphery is provided at the emergence opening of the mirror box, of light illuminating the original from the mirror box, light is diffused most at the central portion, where amounts of light are greatest. Thus, unevenness of illumination onto the original is suppressed.

A tenth aspect of the present invention is an image reading device according to the eighth aspect wherein the diffuser is a diffusion member provided centrally at the entrance opening, the diffusion member and the entrance opening each having a peripheral edge spaced apart from one another.

An eleventh aspect of the present invention is an image reading device according to the ninth aspect wherein the diffuser is a diffusion member provided centrally at the emergence opening, the diffusion member and the emergence opening each having a peripheral edge spaced apart from one another.

Operation of the tenth and eleventh aspects of the present invention is explained below.

Because the diffusion member is provided only at the central portion of the entrance opening or emergence opening, of the light that enters or leaves the mirror box, light is diffused only at the central portion, where amounts of light are greatest. Thus, unevenness of illumination onto the original is suppressed.

A twelfth aspect of the present invention is an image reading device according to the eighth aspect wherein the diffuser is a diffusion member provided at the entrance opening, said diffusion member having a central portion and a peripheral portion, and said central portion being thicker than said peripheral portion.

A thirteenth aspect of the present invention is an image reading device according to the ninth aspect wherein the diffuser is a diffusion member provided at the emergence opening, said diffusion member having a central portion and a peripheral portion, and said central portion being thicker than said peripheral portion.

Operation of the twelfth and thirteenth aspects of the present invention is explained below.

Because the diffusion member provided at the entrance opening or emergence opening is thicker at the central portion than at the periphery, of the light that enters or leaves the mirror box, light is diffused most at the central portion, where amounts of light are greatest. Thus, unevenness of illumination onto the original is suppressed.

A fourteenth aspect of the present invention is an image reading device according to the first aspect, further including: a mirror box between the light source and the original, the mirror box having an internal reflection surface which reflects light from the light source, the mirror box thereby illuminating the original, and the mirror box having an entrance opening at which light from the light source enters the mirror box and an emergence opening at which light leaves the mirror box toward the original; and an ND filter provided centrally at one of the openings, the ND filter and the one of the openings each having a peripheral edge spaced apart from one another.

Operation of the fourteenth aspect of the present invention is explained below.

Because the ND filter is provided only at the central portion of the entrance opening or emergence opening, of the light that enters or leaves the mirror box, amounts of light transmitted are reduced at the central portion, where amounts of light are greatest. Thus, unevenness of illumination onto the original is suppressed.

A fifteenth aspect of the present invention is an image reading device according to the first aspect, further including: a mirror box between the light source and the original, the mirror box having an internal reflection surface which reflects light from the light source, the mirror box thereby illuminating the original, and the reflection surface being formed by a diffusion member.

Operation of the fifteenth aspect of the present invention is explained below.

Because the reflective surface inside the mirror box is formed by a diffusion member, diffusion of light at the mirror box is greater. Thus, unevenness of illumination onto the original is suppressed.

A sixteenth aspect of the present invention is an image reading device according to the first aspect wherein the area sensor is formed by imaging elements and an amount of light received by the area sensor is controlled by means of controlling an accumulation time of the imaging elements.

Operation of the sixteenth aspect of the present invention is explained below.

By controlling the accumulation time of the imaging elements at a time of fine-scanning, insufficiencies of light of each wavelength can be corrected. For example, a shortage of blue light can be corrected for by increasing the corresponding accumulation time.

A seventeenth aspect of the present invention is an image reading device according to the first aspect wherein an amount of light received by the area sensor is controlled by means of controlling driving factors of the light emitting diodes.

Operation of the seventeenth aspect of the present invention is explained below.

By controlling the driving factors of the light emitting diodes at a time of fine-scanning, insufficiencies of light of each wavelength can be corrected. For example, if blue light is insufficient, the amount of light can be increased accordingly by increasing the driving factors (e.g., current) of the corresponding light emitting diodes rather than increasing the accumulation time at the area sensor. That is, inadequate amounts of light can be corrected for without increasing image reading time.

An eighteenth aspect of the present invention is an image reading device according to the first aspect, further including: a correction section that stores in advance respective shading correction values corresponding to different wavelengths of light emitted from the light source, and corrects shadings of image data read respectively at each wavelength on the basis of the shading correction values.

Operation of the eighteenth aspect of the present invention is explained below.

Shading correction can be performed by correcting the image data that has been read on the basis of the shading correction values that were set in advance.

A nineteenth aspect of the present invention is an image reading device according to the first aspect wherein shading correction is performed by reading an image in a state in which the original is not present, and separately controlling output of each light emitting diode element on the basis of an output value of the area sensor.

Operation of the nineteenth aspect of the present invention is explained below.

Image reading is performed without the original being present, and each light emitting diode is respectively separately controlled on the basis of the obtained image data (unevenness of illumination). The light source is actually a collection of point light sources. Thus, the amount of light from each point light source can be controlled and unevenness of illumination can be suppressed (shading correction can be performed).

A twentieth aspect of the present invention is an image reading device according to the first aspect, further including: a photoelectric transducer that detects an amount of light between the original and the light source, wherein output of the light emitting diodes is kept constant on the basis of output of the transducer.

Operation of the twentieth aspect of the present invention is explained below.

Feedback control is performed on the basis of amounts of light of each wavelength emitted from the light emitting diodes. Thus, changes in brightness when the light emitting diodes are lit can be suppressed.

BRIEF DESCRIPTION OF THE DRAWINGS

FIG. 11 is a side view showing a schematic structure of an optical system of an area CCD scanner relating to the third embodiment of the present invention.

DESCRIPTION OF THE PREFERRED EMBODIMENTS

Figure 1:
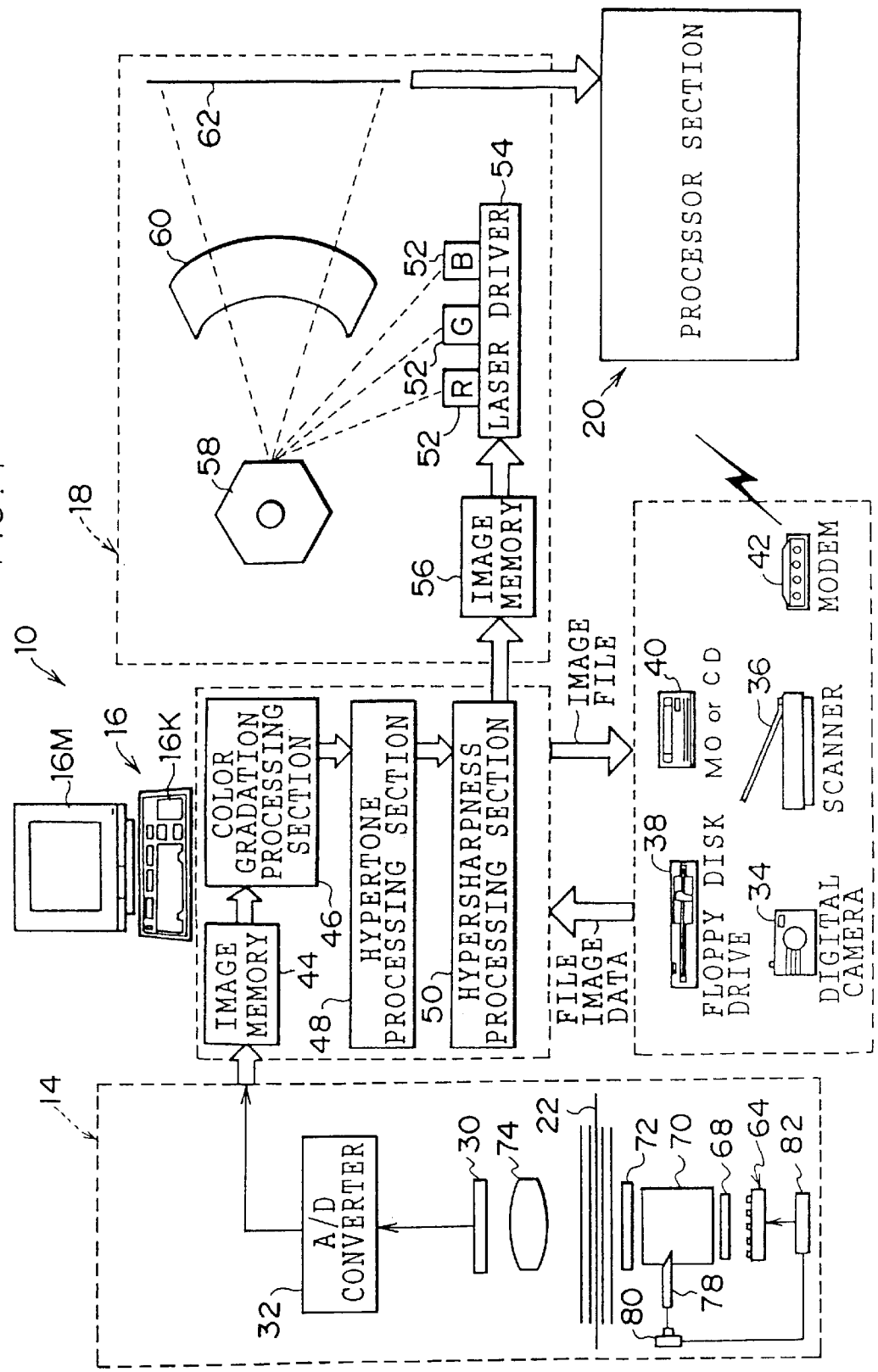
FIG. 1 is a schematic structural view of a digital lab system relating to the first embodiment of the present invention.
Figure 2:
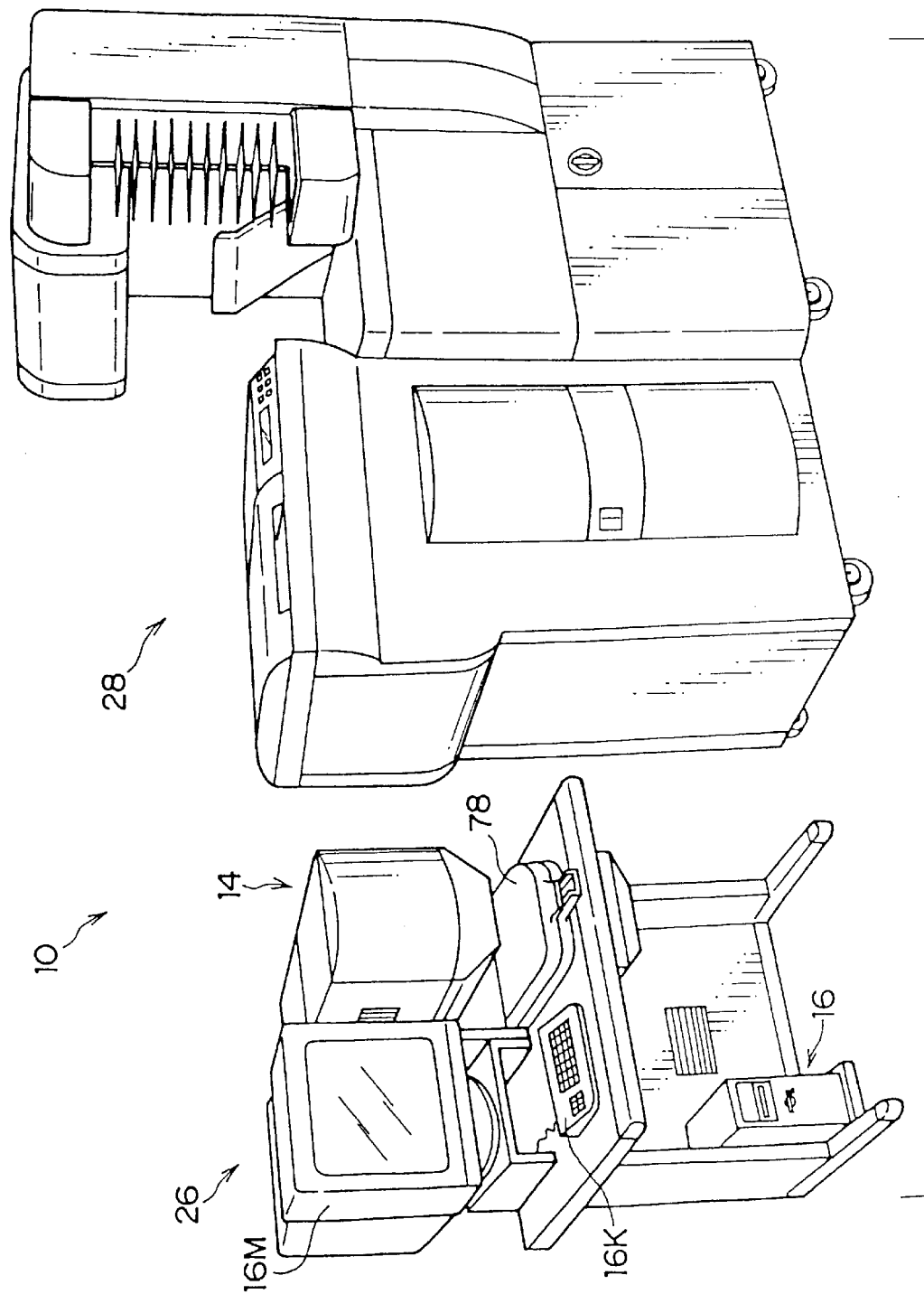
FIG. 2 is an external view of the digital lab system.

A schematic structural view of a digital lab system 10 relating to the first embodiment of the present invention is shown in FIGS. 1 and 2.

As shown in FIG. 1, the digital lab system 10 has a structure including an area CCD scanner 14, an image processing section 16, a laser printer section 18, and a processor section 20. The area CCD scanner 14 and the image processing section 16 are integrated as an input section 26 shown in FIG. 2. The laser printer section 18 and the processor section 20 are integrated as an output section 28 shown in FIG. 2.

The area CCD scanner 14 is for reading frame images recorded on photographic films such as negative films, reversal films and the like. For example, the area CCD scanner 14 can perform image reading of frame images on 135 size photographic film, 110 size photographic film, photographic film with a transparent magnetic layer formed thereon (240 size photographic film, known as APS film), and 120 and 220 size (brownie size) photographic film. The area CCD scanner 14 reads the image reading frame images at an area CCD 30, performs A/D conversion at an A/D converter 32, and outputs image data to the image processing section 16.

Further, the present embodiment, being the digital lab system 10 when applied for a 135 size photographic film 22, is explained.

The image data (scan image data) that is outputted from the area CCD scanner 14 is inputted to the image processing section 16. The image processing section 16 is structured such that image data from an external portion (generically referred to hereinafter as file image data) can also be inputted, such as image data obtained by photography by a digital camera 34 or the like, image data obtained by reading an original (e.g. a reflecting original or the like) with a scanner 36 (a flatbed type), and image data created at another computer and recorded at a floppy disk drive 38, recorded at an MO drive or CD drive 40, communicated and received via a modem 42, or the like.

The image processing section 16 stores inputted image data at an image memory 44. The image processing section 16 performs image processing, which is various kinds of correction and the like, on the inputted image data at a color gradation processing section 46, a hypertone processing section 48, a hypersharpness processing section 50, and the like. The image processing section 16 then outputs image data to the laser printer section 18 as image data for recording. Further, the image processing section 16 can also output image processed image data to an external portion as an image file. (For example, the image processing section 16 can output data to a recording medium such as a floppy disk, CD or MO, send data to other information processing equipment via a communication circuit, or the like.)

The laser printer section 18 is provided with R, G and B laser light sources 52. The laser printer section 18 controls a laser driver 54. The laser printer section 18 illuminates developing paper with laser light that is modulated in accordance with the image data for recording that is inputted from the image processing section 16 (and which is temporarily stored at an image memory 56). The laser printer section 18 records an image at developing paper 62 by scanning exposure (an optical system in the present embodiment principally uses a polygon mirror 58 and an f-θ lens 60). Further, the processor section 20 performs various processes, such as color development, bleach fixing, washing, and drying, on the developing paper 62 onto which the image has been recorded by scanning exposure by the laser printer section 18. Hence, the image is formed on the developing paper.

Structure of the Area CCD Scanner

Figure 3:
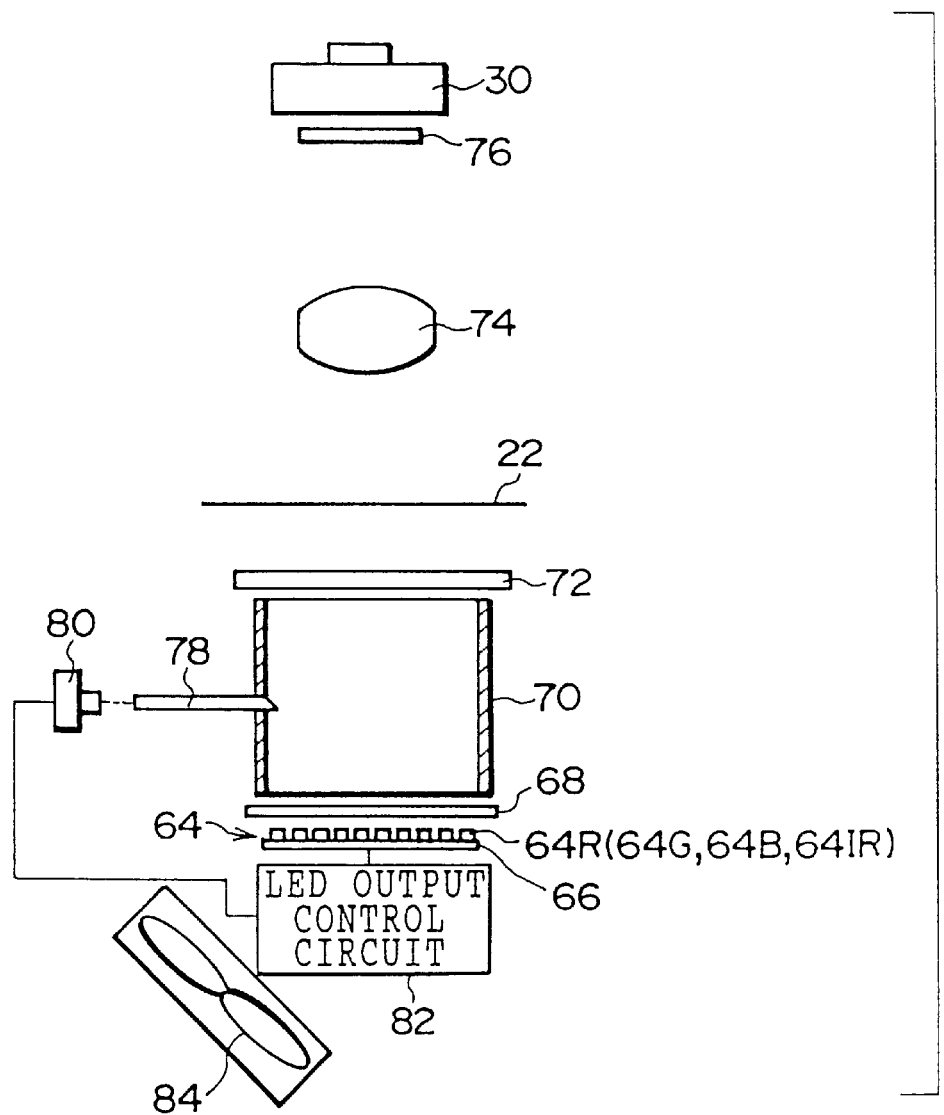
FIG. 3 is a side view showing a schematic structure of an optical system of an area CCD scanner.

Next, a structure of the area CCD scanner 14 is described. A schematic structure of an optical system of the area CCD scanner 14 is shown in FIG. 3.

The optical system is provided with light emitting diodes (hereinafter called LEDs) 64 at the light source. Pluralities of LED elements 64R, 64G, 64B and 64IR, which respectively display red, green, blue and infrared light (which lights are in some cases hereinafter referred to as R, G, B and IR, respectively), are disposed in an array form on a substrate 66. (In FIGS. 4A, 4B, 5A and 5B the LEDs are denoted simply by R, G, B and IR, for the sake of convenience of description.) Therefore, a photographic film can be illuminated with red, green, blue or infrared light by independent lighting of one of the types of LED element, 64R, 64G, 64B and 64IR.

Figure 4A:
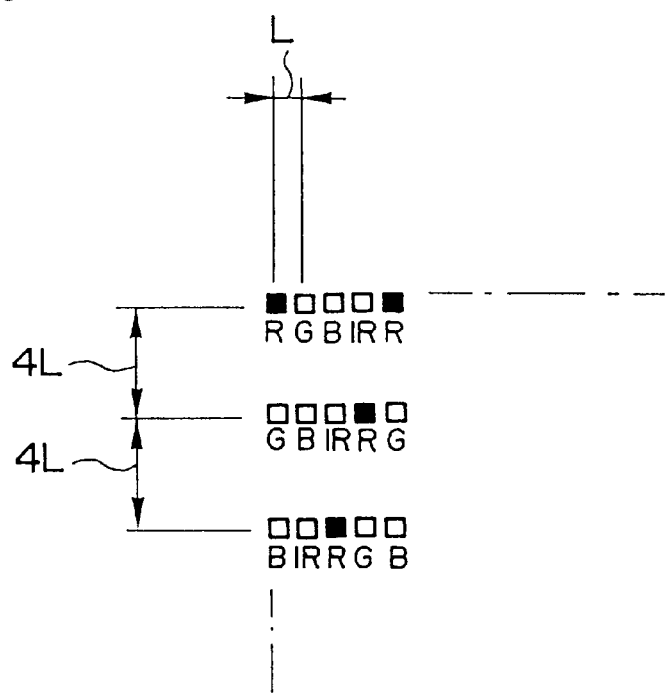
FIG. 4A is a view of a light emitting diode element layout example at light emitting diodes.

As shown in FIG. 4A, the LED elements 64R, 64G, 64B and 64IR are disposed in rows and columns in a mosaic form. Specifically, from one line to an adjacent line, the positions of the LED elements 64R, 64G, 64B and 64IR shift by one place. When a spacing between the columns is L, a spacing between the rows is 4L. That is, the disposition is such that an aspect ratio is 1:4. Because of this disposition, unevenness of the light of each color is suppressed.

Figure 4B:
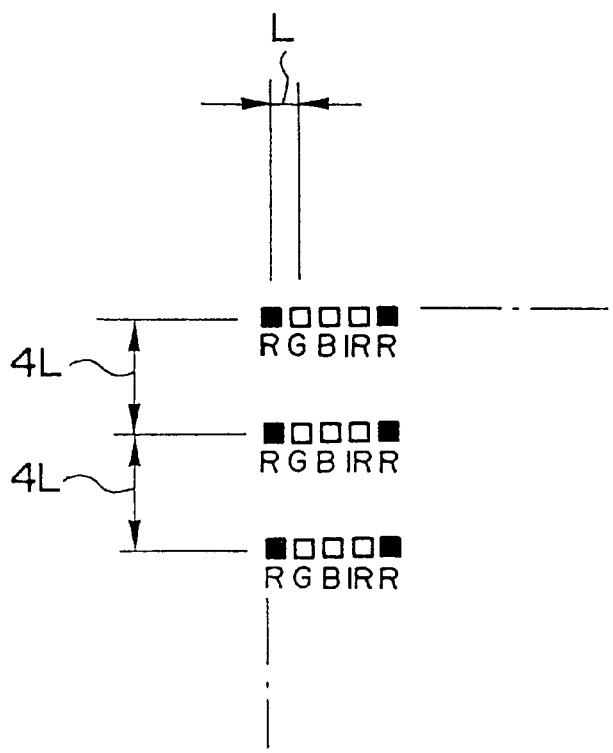
FIG. 4B is a view of a light emitting diode element layout example at light emitting diodes.
Figure 5A:
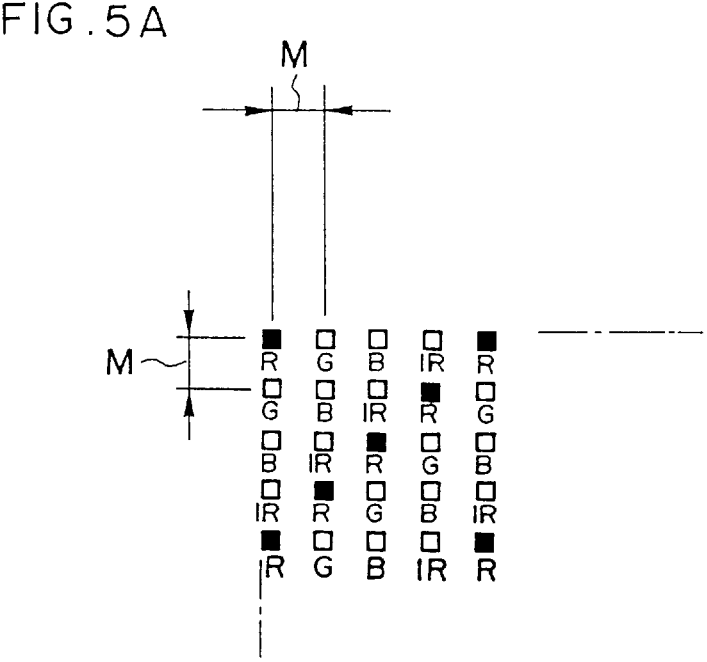
FIG. 5A is a view of a light emitting diode element layout example at light emitting diodes.
Figure 5B:
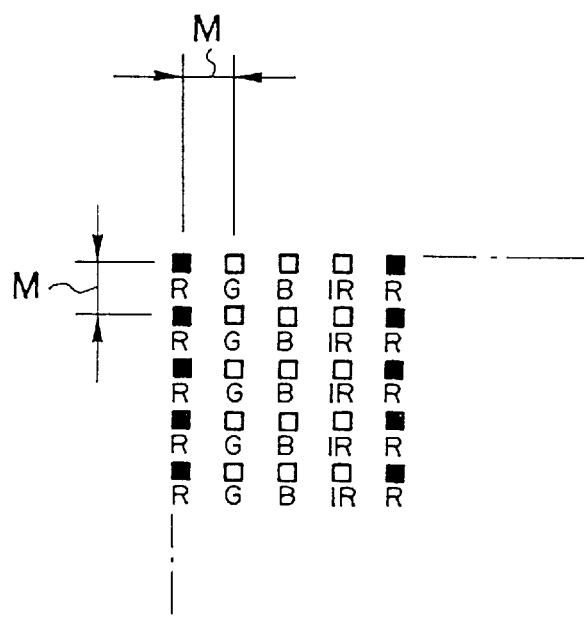
FIG. 5B is a view of a light emitting diode element layout example at light emitting diodes.
Figure 6:
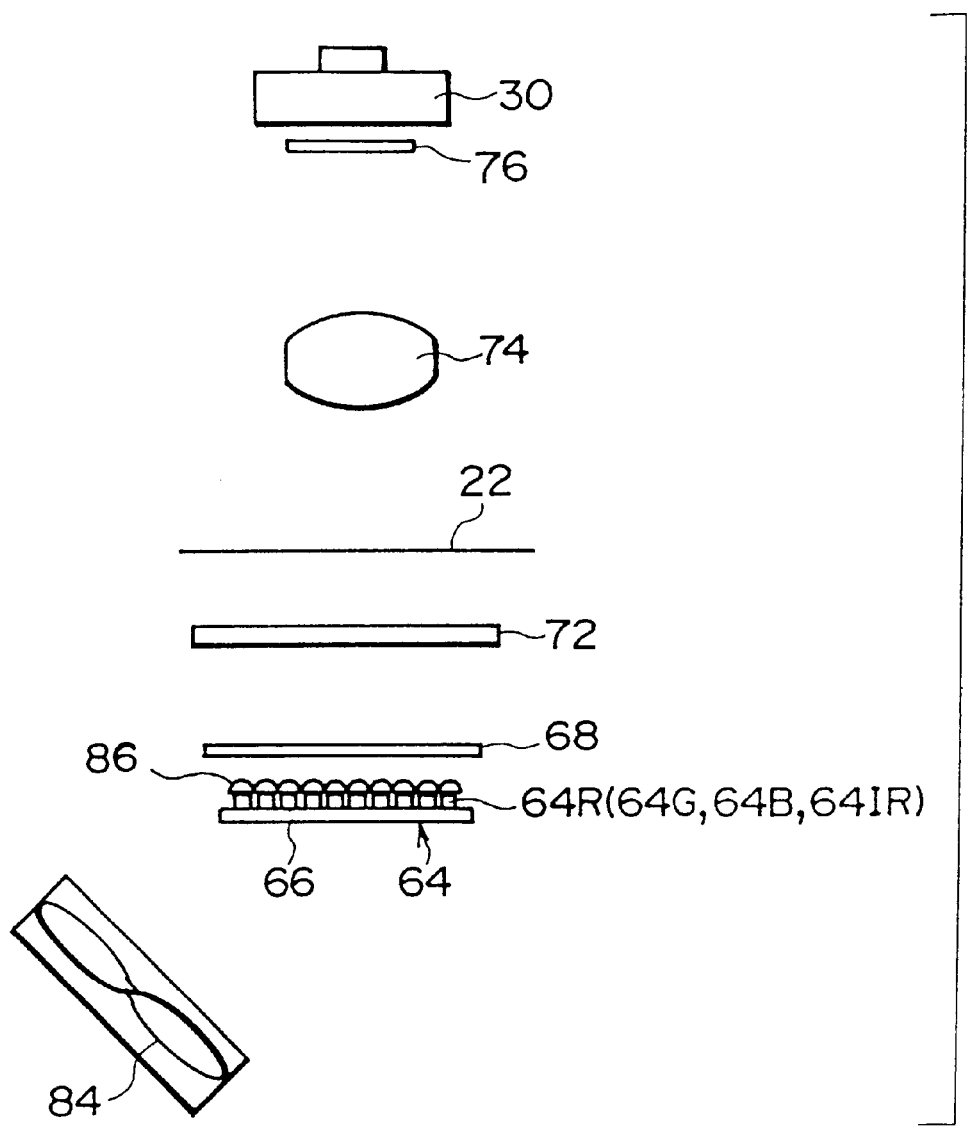
FIG. 6 is a side view showing a schematic structure of an optical system of an area CCD scanner relating to the second embodiment of the present invention.

Further, regarding the layout, it is acceptable if the types of LED elements. 64R, 64G, 64B and 64IR are respectively laid out in individual respective rows (see FIG. 4B). It is also acceptable if the layout is the same as in FIG. 4A or 4B but the row spacing equals the column spacing (row spacing and column spacing are both M) (see FIGS. 5A and 5B). However, the layout shown in FIG. 4A is the most suppressive of unevenness of light.

A diffusion plate 68, a diffusion box 70, and a Fresnel lens 72 are disposed between the LEDs 64 and the photographic film 22. The diffusion box 70 reflects light thereinside and guides light to the photographic film 22. The Fresnel lens 72 gathers light emitted from the diffusion box 70 onto the photographic film 22. Thus, a distribution of each type of light emitted from the LED elements 64R, 64G, 64B and 64IR is uniform and is illuminated onto a frame image.

The photographic film 22 is conveyed by an unillustrated film carrier. The photographic film 22 stops at a predetermined position and, after the frame image has been read, is conveyed by the pitch distance of the image frames.

A lens unit 74 that images light passing through the photographic film 22, a shutter 76 and the area CCD 30, which is provided at the imaging position, are sequentially disposed at a side of the photographic film 22 opposite to the side of the photographic film 22 at which the LEDs 64 are disposed.

The area CCD 30 is a monochrome image sensor. Each color of the LED elements 64R, 64G, 64B and 64IR is separately lit in turn. Thus, the area CCD 30 performs image reading for each color.

A light guide 78 is disposed inside the diffusion box 70. The light guide 78 guides the light inside the diffusion box 70 to a photoelectric transduction element 80. Hence, light levels of the LEDs 64 are detected by the photoelectric transduction element 80. An LED output control circuit 82 controls the outputs of the LED elements 64R, 64G, 64B and 64IR on the basis of output from the photoelectric transduction element 80, in order to suppress changes of intensity immediately after lighting up.

A fan 84 is disposed in the vicinity of the LEDs 64. The fan 84 is driven for cooling, to prevent ambient temperature affecting the LEDs 64. The structure is such that the LEDs 64 can be adjusted to within a predetermined temperature range.

The operation of the first embodiment is described below.

Firstly, shading correction data is obtained. While the photographic film 22 is not yet loaded on the film carrier, the LEDs 64 illuminate the film carrier with light of each color. Specifically, the LED elements 64R, 64G, 64B and 64IR are lit in turn and frame image data for each color is read at the area CCD 30. Thus, a shading correction amount with respect to each color is set, and stored in the image memory 44.

Next, an operator inserts the photographic film 22 in the film carrier. Commencement of frame image reading is selected from a keyboard 16K of the image processing section 16. At the film carrier, the photographic film 22 is stopped at conveyance intervals of the pitch of the image frames of the photographic film 22. Thus, prescanning is performed.

R, G, B and IR image data are read for the temporarily stopped photographic film 22 in the same manner as for setting of the shading compensation amounts. Further, the area CCD scanner 14 reads various kinds of data outside the image recording area of the photographic film 22, as well as the frame image. The image that is read is displayed on a monitor 16M.

Next, reading conditions for fine-scanning (output of the LED elements 64R, 64G, 64B and 64IR of each color, charge accumulation time of the area CCD 30 of each color, and the like) are set for each frame image on the basis of results of prescanning of the each frame image.

Then, when setting of reading conditions for fine-scanning has been finished with respect to every frame, the photographic film 22 is conveyed in intervals in a direction opposite to a direction of prescanning, and fine-scanning of each frame is executed.

With respect to the temporarily stopped photographic film 22, first, respective image data of R, G, B and IR are read in the same manner as in prescanning. At this time, the light level in the diffusion box 70 is detected from the light guide 78 via the photoelectric transduction element 80, and the outputs (current, voltage, etc.) of the LED elements 64R, 64G, 64B and 64IR are controlled by the LED output control circuit 82. Thus, changes of intensity immediately after lighting up of each of the types of LED element 64R, 64G, 64B and 64IR can be suppressed, and image reading can be performed satisfactorily.

Further, effects of ambient temperature on the LED elements 64R, 64G, 64B and 64IR are inhibited by cooling by the fan 84.

At this time, the photographic film 22 is being scanned in the direction opposite to the direction of prescanning. Thus, fine-scanning is executed in sequence from a last frame to a first frame. Further, conditions of the images were identified at prescanning (for example, aspect ratios of the photographic images, normal exposure or under-, over- or superover-exposure photography, the use or not of flash photography, and the like). Thus, reading can be performed with appropriate reading conditions.

RGB image data and IR image data, which have been read as described above, are stored in the image memory 44. Shading is corrected by respective shading correction amounts.

Pixels of the shading-corrected IR image data whose outputs are below a threshold value are detected at the image processing section 16 as pixels where dirt or damage has been applied at the frame image (inappropriate pixels). Corresponding pixels of the RGB image data are corrected by interpolation and the like. Hence, effects of dirt and damage applied to the photographic film 22 can be avoided at reading.

Hence, in the present embodiment, the LEDs 64 are used as the light source. Thus, the light source is comparatively more compact than a halogen lamp, and infrared-cut filters and light modulation filters are no longer required. Thus, structure is simplified and costs are reduced.

The LEDs 64 are the LED elements 64R, 64G, 64B and 64IR disposed so as to be mixed. Thus, light of each color in turn can illuminate the image frames of the photographic film 22 from substantially the same light source, and image reading can be performed at the area CCD 30. Thus, reading time can be greatly reduced.

The image data is corrected by the shading correction amount for each color. Thus, shading correction can be done for each color. Further, the light level in the diffusion box 70 is detected by the photoelectric transduction element 80 via the light guide 78. The output of the LED elements 64R, 64G, 64B and 64IR is corrected by feedback at the LED output control circuit 82, and changes of intensity at a time of lighting can be suppressed.

An object of the present embodiment is a transparent film such as the photographic film 22, but the invention can also be applied to reading of a reflective original.

Also, in the present embodiment, image data is corrected by shading correction, but correction can also be performed as described below.

That is, when the photographic film 22 is not yet mounted, light of each color in turn illuminates from the LEDs 64, and the area CCD 30 reads the light. Unevenness of illumination of each color is detected by image data read by the area CCD 30. Output of each of the LED elements 64R, 64G, 64B and 64IR is separately controlled by feedback of the data at the LED output control circuit 82, and unevenness of the illumination is suppressed. Specifically, unevenness of the illumination can be suppressed by individually controlling the output of each of the LED elements 64R, 64G, 64B and 64IR, which are substantially point light sources (shading correction can be performed).

Next, a digital lab system relating to a second embodiment of the present invention is described. The same reference numbers are applied to the same components as for the first embodiment, and detailed explanation of those components is omitted. In the second embodiment, only area CCD scanner 14 parts are different. Thus, only those parts are explained.

In the present embodiment, by appropriately designing a layout of the LED elements 64R, 64G, 64B and 64IR of the LEDs 64, it is intended to further reduce unevenness of illumination onto the image frames of the photographic film 22.

That is, the first embodiment is designed to suppress unevenness of illumination by a layout in which the LED elements 64R, 64G, 64B and 64IR are uniformly distributed across the whole LEDs 64 area. However, in that layout, amounts of light are larger in a central portion than at a peripheral portion (see FIG. 7).

Figure 8:
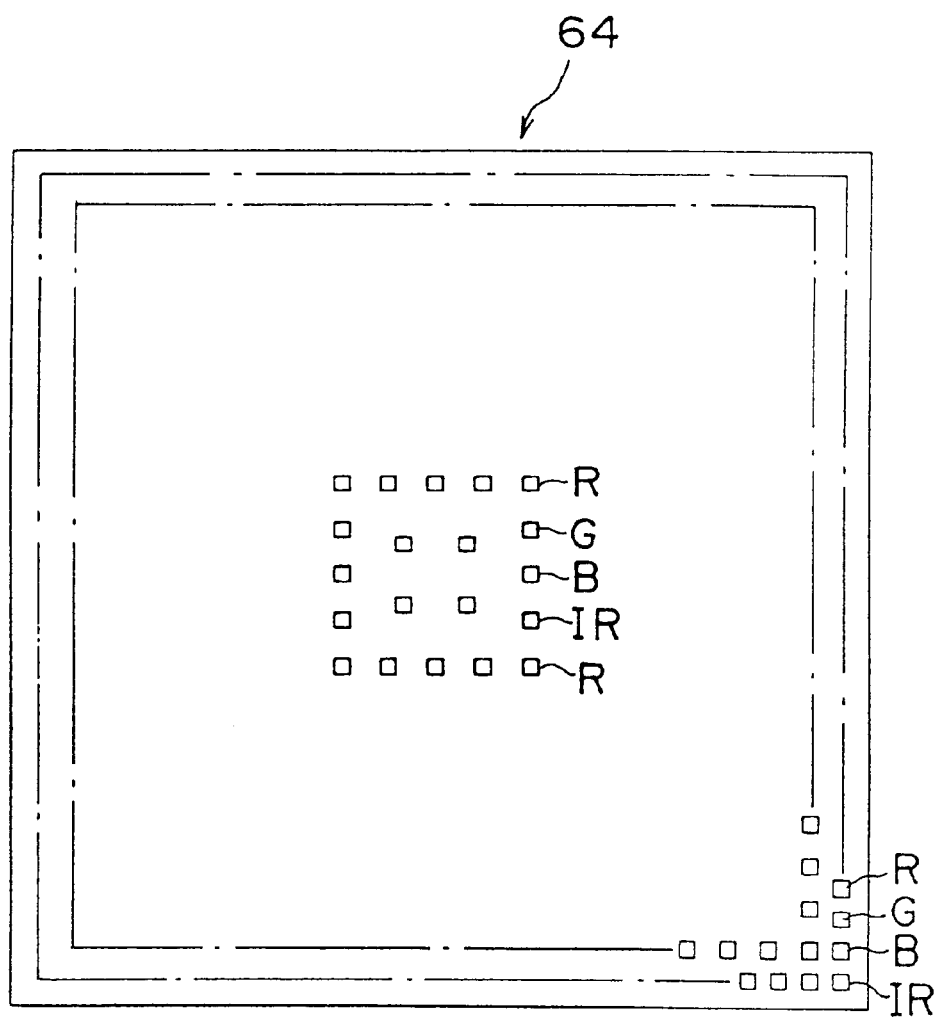
FIG. 8 is a view of a light emitting diode element layout example at light emitting diodes relating to the second embodiment of the present invention.

Therefore, in the present embodiment, the LED elements 64R, 64G, 64B and 64IR are more densely distributed at the peripheral portion than at the central portion, as shown in FIG. 8. Consequently, disposition density of the LED elements 64R, 64G, 64B and 64IR is highest at the peripheral portion. Therefore, unevenness of illumination from the LEDs 64 is suppressed, and accuracy of image reading is further improved.

Figure 7:
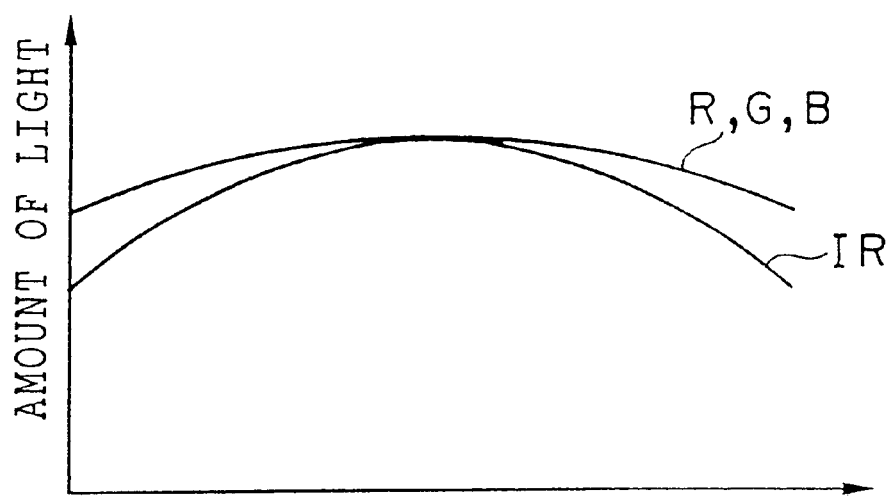
FIG. 7 is an explanatory drawing showing distributions of amounts of light in a case in which the light emitting diode elements are distributed uniformly.

Further, as shown in FIG. 7, the difference between amounts of light at the central portion and at the peripheral portion is larger for IR than for R, G and B. Therefore, if the proportion of the LED elements 64R, 64G, 64B and 64IR in a unit of area that are LED elements 64IR increases from the central portion of the light source to the peripheral portion thereof, the relative largeness of the difference between amounts of light at the central portion and at the peripheral portion for IR, as compared to R, G and B, can be eliminated.

Next, a digital lab system relating to a third embodiment of the present invention is described. The same reference numbers are applied to the same components as for the first embodiment, and detailed explanation of those components is omitted. In the third embodiment, only area CCD scanner 14 parts are different. Thus, only those parts are explained.

The present embodiment is designed to eliminate unevenness of illumination by adjusting diffusiveness rather than the light source.

Figure 9:
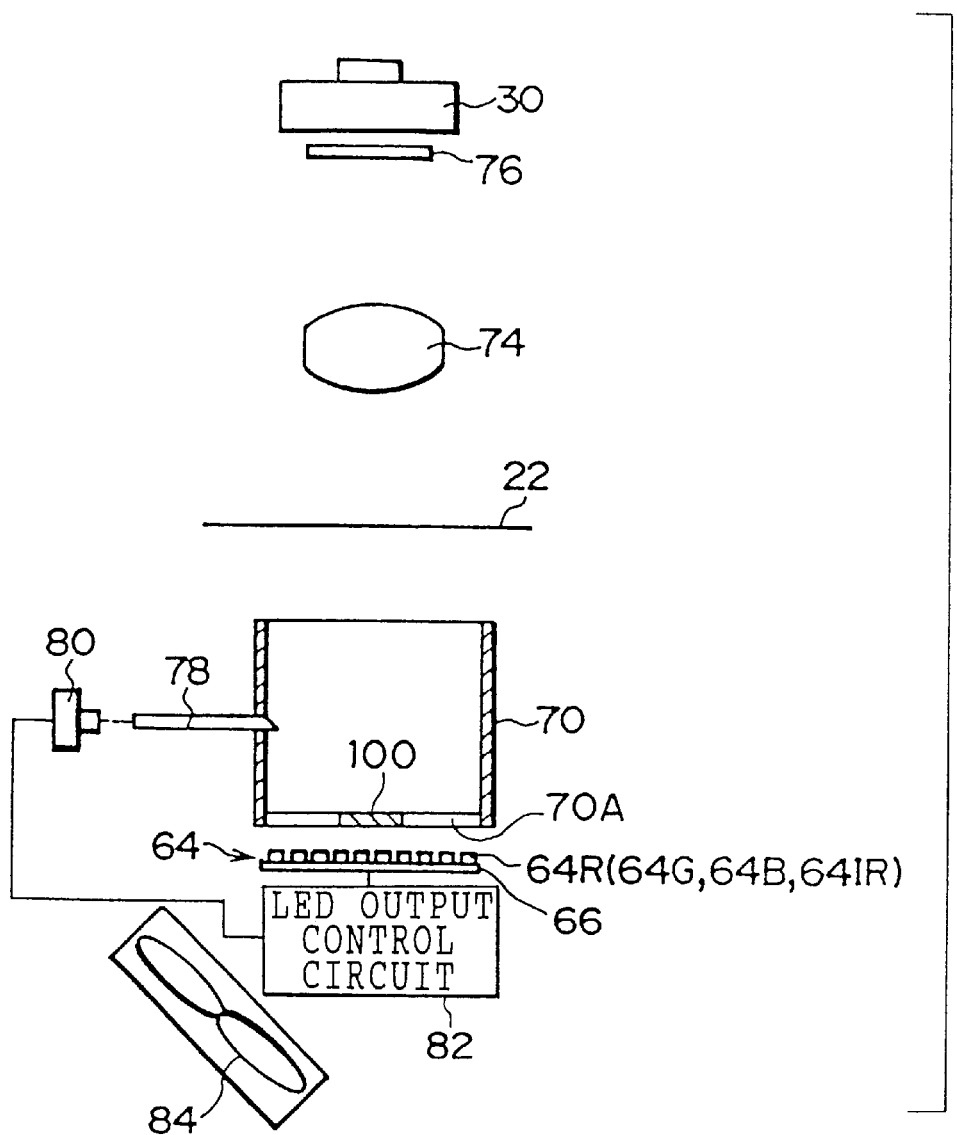
FIG. 9 is a side view showing a schematic structure of an optical system of an area CCD scanner relating to the third embodiment of the present invention.

Specifically, a diffusion member 100 is disposed only at a central portion of an entrance opening 70A of the diffusion box 70, as shown in FIG. 9.

Because of this structure, of light reaching the entrance opening 70A of the diffusion box 70 from the LEDs 64, only light at the central portion, which is stronger, is diffused. Thus, unevenness of illumination onto the frame images of the photographic film 22 is suppressed.

The same function can also be achieved by an ND filter disposed at the central portion of the entrance opening 70A, in place of the diffusion member 100, so as to reduce amounts of light transmitted through the central portion.

Figure 10:
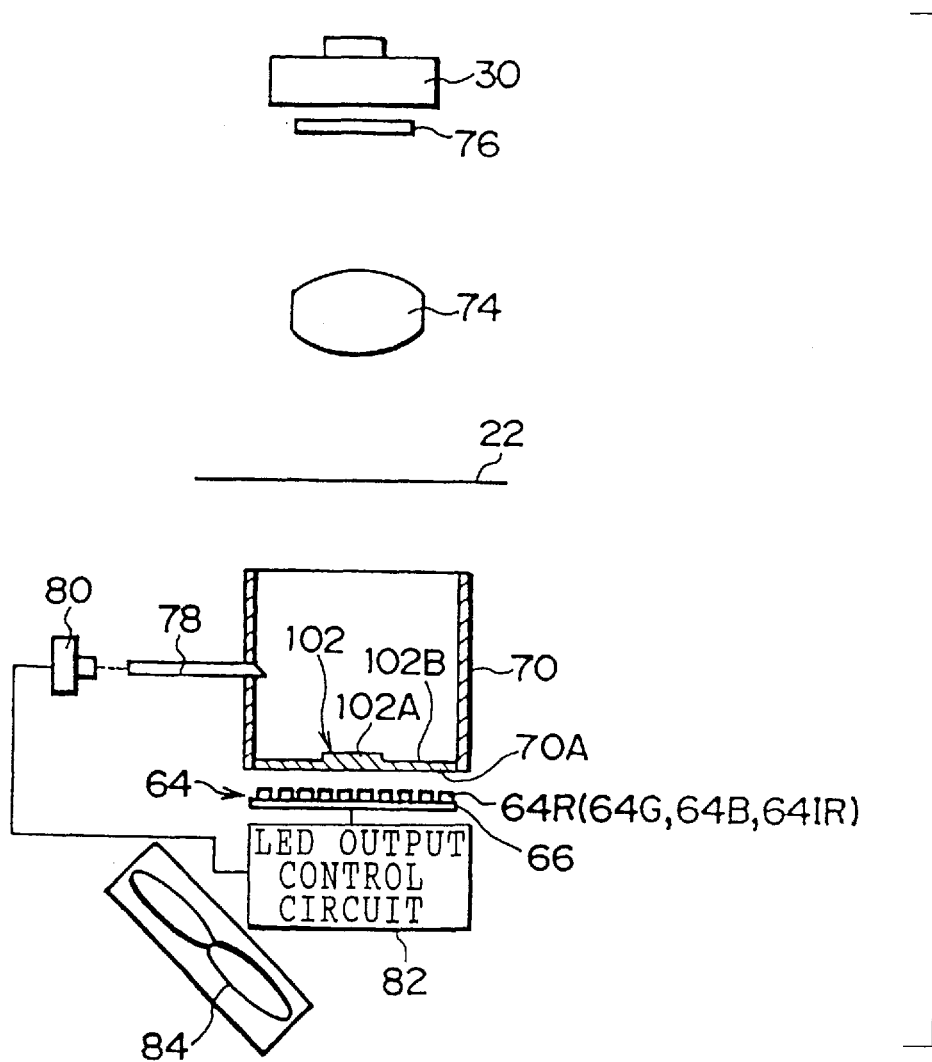
FIG. 10 is a side view showing a schematic structure of an optical system of an area CCD scanner relating to the third embodiment of the present invention.

The same operation can, moreover, be achieved by disposing a diffusion member 102, whose central portion 102A is thicker than a peripheral portion 102B, at the entrance opening 70A of the diffusion box 70, as shown in FIG. 10.

Furthermore, the same function can be achieved by disposing a diffusion member 104 having uniform thickness at the entrance opening 70A of the diffusion box 70 and disposing a diffusion member 108, whose central portion 108A is thicker than a peripheral portion 108B, at an emergence opening 70B, as shown in FIG. 11.

Moreover, any of the structures explained above as structures applied at the entrance opening 70A can be applied at the emergence opening 70B, or a combination of the structures can be applied at the entrance opening 70A and the emergence opening 70B together.

Additionally, if an inner wall 70C of the diffusion box 70 is formed by a diffusion member, diffusiveness inside the diffusion box 70 can be improved. Thus, unevenness of illumination onto the original can be further suppressed.

Next, a digital lab system relating to a fourth embodiment of the present invention is described. The same reference numbers are applied to the same components as for the first embodiment, and detailed explanation of those components is omitted. In the fourth embodiment, only area CCD scanner 14 parts are different. Thus, only those parts are explained.

A fisheye lens 86 is attached at each of the LED elements 64R, 64G, 64B and 64IR of the LEDs 64. Thus, parallel beams of light illuminate at a photographic film 22 side of the fisheye lenses 86. The light, which is diffused at the diffusion plate 68 to suppress unevenness, passes through the Fresnel lens 72 and illuminates an image frame of the photographic film 22. That is, in contrast to the dispersive optics of the first embodiment, the fourth embodiment has a condensing light source.

At the thusly structured area CCD scanner 14, prescanning and fine-scanning are performed in the same way as in the first embodiment. That is, after shading correction using shading correction values obtained from infrared image data and RGB image data in the same way as in the first embodiment, inappropriate pixels are detected on the basis of the infrared image data, the visible image data for the inappropriate pixels is corrected, effects of dirt and damage can be avoided, and image reading can be performed.

Moreover, with regard to control of amounts of light received by the area CCD 30, output may be controlled, by controlling amounts of light from the LED elements 64R, 64G, 64B and 64IR (driving factors) on the basis of the image data of the area CCD 30, or the amount of light received may be controlled, by controlling accumulation times of imaging elements of the area CCD 30.

As described above, the image reading device relating to the present invention has excellent effects in that inappropriate pixels are detected by invisible light and, by correction of the visible image data for the inappropriate pixels, effects on image reading of dirt and damage at an original can be avoided.

Other effects are that, compared with cases in which halogen lamps are used, power consumption is lower and less heat is generated, because LEDs are used as light sources. Moreover, cut filters and light modulation filters are no longer necessary.

What is claimed is:

1. An image reading device which reads an image recorded at an original, using visible light for reading the image and invisible light for detecting inappropriate pixels, and corrects inappropriate pixels of image data, comprising:

a light source formed by light emitting diodes which emit visible light for reading the image and invisible light for detecting inappropriate pixels;

an area sensor which reads the image by receiving visible and invisible light that has been one of transmitted and reflected by the image; and an image processing section which detects inappropriate pixels on the basis of invisible light image data, which has been read by invisible light at the area sensor, and corrects the inappropriate pixels at visible light image data, which has been read by visible light.

2. An image reading device according to claim 1, wherein the light source is formed by light emitting diode elements that emit visible light and which are disposed in array form, and light emitting diode elements that emit invisible light and which are disposed in array form.

3. An image reading device according to claim 2, wherein the light source is formed by light emitting diode elements of each of at least four wavelengths, including at least three visible light region wavelengths and one invisible light region wavelength, said light emitting diode elements of each wavelength being arranged in a pattern which is planar and which is the same as patterns of the light emitting diode elements of other wavelengths.

4. An image reading device according to claim 2, wherein the light source is formed by a plurality of types of light emitting diode elements disposed in rows and columns, which types of light emitting diode element respectively emit at different wavelengths, and the types of light emitting diode element are disposed alternately in at least one direction of a direction of rows and a direction of columns, and a ratio of a spacing between adjacent light emitting diode elements in the one direction to a spacing between adjacent light emitting diode elements in another direction is 1:(number of types of light emitting diode element).

5. An image reading device according to claim 3, wherein the light source is formed by light emitting diode elements disposed such that distributions of light of respective wavelengths are uniform.

6. An image reading device according to claim 1, wherein the light source has a central portion and a peripheral portion, and the light emitting diode elements that form the light source are disposed more densely at the peripheral portion than at the central portion.

7. An image reading device according to claim 1, wherein the light source has a central portion and a peripheral portion, the light source is formed by a plurality of light emitting diode elements that emit visible light and a plurality of light emitting diode elements that emit invisible light, and the proportion of the light emitting diode elements that are light emitting diode elements that emit invisible light increases from the central portion to the peripheral portion.

8. An image reading device according to claim 1, further comprising:

a mirror box between the light source and the original, said mirror box having an internal reflection surface which reflects light from the light source, said mirror box thereby illuminating the original, and said mirror box having an entrance opening at which light from the light source enters the mirror box; and a diffuser provided at said entrance opening, said diffuser having a central portion and a peripheral portion, and having higher diffusiveness at said central portion than at said peripheral portion.

9. An image reading device according to claim 1, further comprising:

a mirror box between the light source and the original, said mirror box having an internal reflection surface which reflects light from the light source, said mirror box thereby illuminating the original, and said mirror box having an emergence opening at which light leaves the mirror box toward the original; and a diffuser provided at said emergence opening, said diffuser having a central portion and a peripheral portion, and having higher diffusiveness at said central portion than at said peripheral portion.

10. An image reading device according to claim 8, wherein the diffuser is a diffusion member provided centrally at the entrance opening, the diffusion member and the entrance opening each having a peripheral edge spaced apart from one another.

11. An image reading device according to claim 9, wherein the diffuser is a diffusion member provided centrally at the emergence opening, the diffusion member and the emergence opening each having a peripheral edge spaced apart from one another.

12. An image reading device according to claim 8, wherein the diffuser is a diffusion member provided at the entrance opening, said diffusion member having a central portion and a peripheral portion, and said central portion being thicker than said peripheral portion.

13. An image reading device according to claim 9, wherein the diffuser is a diffusion member provided at the emergence opening, said diffusion member having a central portion and a peripheral portion, and said central portion being thicker than said peripheral portion.

14. An image reading device according to claim 1, further comprising:

a mirror box between the light source and the original, said mirror box having an internal reflection surface which reflects light from the light source, said mirror box thereby illuminating the original, and said mirror box having an entrance opening at which light from the light source enters the mirror box and an emergence opening at which light leaves the mirror box toward the original; and an ND filter provided centrally at one of the openings, the ND filter and said one of the openings each having a peripheral edge spaced apart from one another.

15. An image reading device according to claim 1, further comprising:

a mirror box between the light source and the original, said mirror box having an internal reflection surface which reflects light from the light source, said mirror box thereby illuminating the original, and said reflection surface being formed by a diffusion member.

16. An image reading device according to claim 1, wherein the area sensor is formed by imaging elements and an amount of light received by the area sensor is controlled by controlling an accumulation time of the imaging elements.

17. An image reading device according to claim 1, wherein an amount of light received by the area sensor is controlled by controlling driving factors of the light emitting diodes.

18. An image reading device according to claim 1, further comprising:

a correction section that stores in advance respective shading correction values corresponding to different wavelengths of light emitted from the light source, and corrects shadings of image data read respectively at each wavelength on the basis of the shading correction values.

19. An image reading device according to claim 1, wherein shading correction is performed by reading an image in a state in which the original is not present, and separately controlling output of each light emitting diode element on the basis of an output value of the area sensor.

20. An image reading device according to claim 1, further comprising:

a photoelectric transducer that detects an amount of light between the original and the light source, wherein output of the light emitting diodes is kept constant on the basis of output of the transducer.

21. An image reading device according to claim 3, wherein the light emitting diodes elements are arranged in a pattern in which positions of the light emitting diode elements of each wavelength shift by one place form one line in the pattern to an adjacent line in the pattern.

* * * * *